United States Patent Office 3,294,856
Patented Dec. 27, 1966

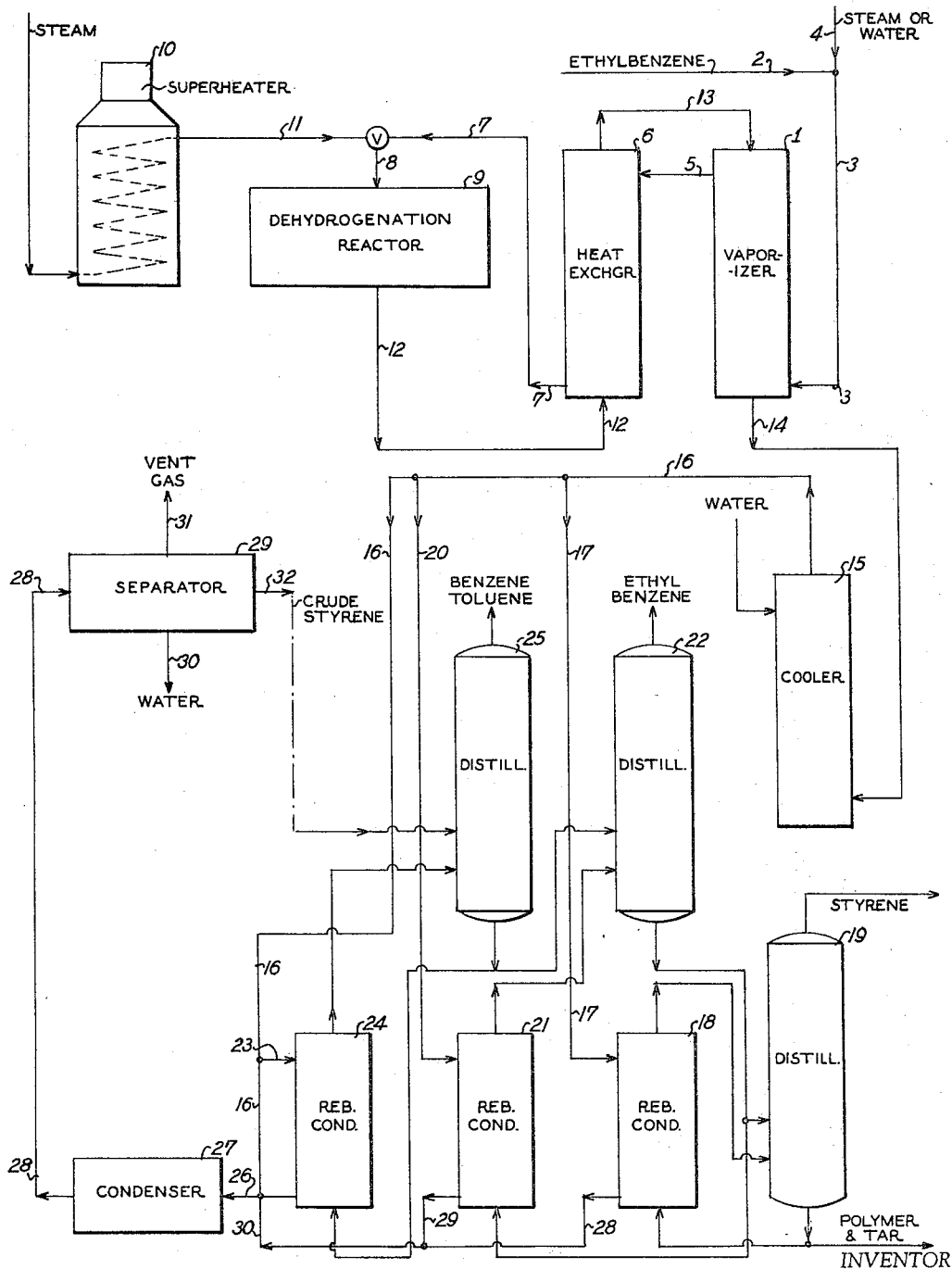

3,294,856
PROCESS FOR PREPARATION AND PURIFICATION OF STYRENE
Harold A. Huckins, Jr., New Canaan, Conn., assignor to Halcon International Inc., a corporation of Delaware
Filed Feb. 4, 1964, Ser. No. 343,193
4 Claims. (Cl. 260—669)

This application is a continuation-in-part of my co-pending application, serial number 119,148, filed June 23, 1961, now abandoned.

This invention relates to the production of styrene. More particularly, this invention relates to an improved method for producing styrene by the dehydrogenation of ethyl benzene.

It is well known in the art to produce systene by the dehydrogenation of ethyl benzene. Presently the vast majority of the styrene commercially produced is prepared by this dehydrogenation technique.

In processes involving the dehydrogenation reaction of ethyl benzene the styrene, the dehydrogenation is normally carried out employing steam in admixture with the ethyl benzene feed to the reactor in order to maintain low styrene partial pressure and also to supply the heat required for this endothermic reaction.

The more steam present, the more favorable the equilibrium for the production of styrene at a given total pressure. Depsite the advantages of high steam ratios, the amount of steam used has been limited by economic factors, e.g., the cost of the heat for vaporizing large quantities of steam. Though the dehydrogenation reactor effluent mixture has conventionally been used to preheat reactor feed gases, the heat expended in vaporizing the steam has hitherto been considered unrecoverable. Furthermore, since the reactor effluent has to be condensed, normally in a water cooled tubular heat exchanger or scrubbing tower, further expenses are incurred by using high steam ratios.

In order to produce satisfactorily pure styrene, the condensed reactor effluent, after separation of the water, must be subjected to a series of distillations to remove impurities including benzene and toluene, ethyl benzene and tars and polymers.

It is an object of the present invention to provide an improved method for producing styrene.

It is a particular object of the invention to produce styrene by the dehydrogenation of ethyl benzene.

It is a special object of the invention to provide an improved process for the separation of styrene from impurities associated therewith while achieving very high process economies.

Other objects of the invention will be apparent from the following description:

In accordance with the instant invention, it has been discovered that, if sufficient water vapor is present, the effluent can be employed in an economical and advantageous manner for supplying heat for the distillation steps essential for the purification of the styrene.

Briefly, a portion of the reactor effluent vapor is passed to the reboiler or reboilers of the distillation columns to supply all or at least part of the heat requirements. A sufficient amount of the effluent is passed to the column so that only the water vapor need condense to supply the required heat input. As a matter of fact, it is mandatory that the condensation of any substantial amount of organic material be prevented, so as to avoid the formation of an organic phase, since styrene in the liquid phase polymerizes rapidly, and, especially in the reboilers, the presence of polymer leads to deposits and sharply lower heat transfer efficiency.

In the absence of a sufficient amount of water vapor, the reactor effluent cannot be employed as a heat source, since a low water content increases the likelihood of the formation of an organic phase and the fouling of the reboilers. At least 50% by weight of the effluent must be water vapor prior to introduction to the reboiler, preferably 65%.

As stated above, it is desirable to have large amounts of water in the feed to the dehydrogenation. Generally, sufficient water is added to the feed to yield a reactor effluent having sufficient water vapor for introduction into the reboilers. If, however, sufficient water is not present, or it is desirable to have even greater quantities of water vapor in the effluent, additional water can be added to the effluent. Since it is desirable to rapidly cool the effluent to avoid side reactions, such as dealkylation, the addition of water directly into the effluent serves a two-fold purpose. The reactor effluent vapor is rapidly cooled from its exit temperature of over 600° C. to just above its dew point, e.g., about 105° C. It is preferably at this temperature of incipient condensation that the reactor effluent is passed to the reboilers. The advantages of the invention, however, can be achieved so long as the effluent is cooled within 50° C. of the dew point, preferably 10° C. Again a two-fold benefit is secured. Not only does the rapid cooling prevent side reactions of the effluent itself, but it also reduces the tendency to polymerize the liquid styrene in the distillation columns.

The dehydrogenation can be carried out at temperatures of the order of about 500° C. to 750° C., using about 1 to 10 pounds of steam per pound of ethyl benzene, and dehydrogenation catalysts such as zinc, chromium, iron, or magnesium oxide, on activated charcoals, aluminas, or bauxites, with conversions of 30–70% of ethyl benzene.

The reactor effluent comprises ethyl benzene, styrene, steam, and associated hydrocarbon materials.

The attached drawing is a schematic flow sheet of a practice of the invention and illustrates the invention.

Referring to the accompanying drawing, in a particular practice of the invention about 100 parts by weight of fresh ethyl benzene feed is charged to vaporizer 1 through lines 2 and 3. About 40 parts of steam or water is combined with fresh ethyl benzene feed and charged to the vaporizer through lines 4 and 3. The ethyl benzene-water mixture is vaporized in vaporizer 1 by indirect heat exchange with effluent from the ethyl benzene dehydrogenation reactor. The vaporized feed mixture is passed by means of line 5 to preheater 6 wherein the temperature of the feed mixture is increased to about 530° C. by indirect heat transfer with the reactor effluent The preheated feed mixture passes from heat exchanger 6 through lines 7 and 8 to reactor 9 wherein the ethyl benzene is dehydrogenated to styrene. About 220 parts of steam is superheated in superheater 10 and combined with the ethyl benzene-steam charge to the reactor by means of lines 11 and 8. The combined gaseous charge mixture to the dehydrogenator is at a temperature of about 630° C.

In the dehydrogenation reactor 9, ethyl benzene is catalytically dehydrogenated to styrene using a fixed bed iron oxide-based catalyst. About 40% of the ethyl benzene is converted to styrene. As a result of the endothermic nature of the reaction, the gaseous effluent which is removed from reactor 9 by the means of line 12 is at a temperature of about 580° C.

The reactor effluent passes by means of line 12 to preheater 6 wherein it is used to preheat fresh feed to the reactor 9.

The reactor effluent passes from preheater 6 at about 440° C. and is transferred by means of line 13 to vaporizer 1 wherein it is employed to vaporize ethyl benzene-water feed to the reactor 9. At about 250° C. the reactor effluent is removed from the vaporizer 1 through line 14 and is sent to cooler 15 wherein water is sprayed into the effluent thereby cooling the effluent to about 105° C.

The reactor effluent is removed from cooler 15 and while still in the vapor state, is then employed to provide the distillation heat to one or more of the reboilers on the columns needed for the separation and purification of the product styrene.

In this preferred embodiment of the invention as illustrated in the accompanying drawing, the cooled reactor effluent vapor is used to provide the distillation heat to all three of the distillation columns which are normally used to purify the reactor effluent styrene. The order of separating out the impurities in styrene can be arranged as shown or, alternatively, in the first column benzene, toluene and ethyl benzene could be separated as an overhead product, in the second column styrene could be separated from the residue, polymer and tar, and in the third column benzene-toluene could be separated from the ethyl benzene.

The cooled reactor effluent vapor from cooler 15 is passed through line 16 and then divided into a plurality of portions, three of which are used in reboilers associated with the styrene purification columns.

One portion comprising about 6% of the effluent is passed by means of lines 16 and 17 to reboiler 18 which is associated with distillation column 19 wherein styrene is separated from higher boiling tar and polymer. Another portion comprising about 50% of the effluent is sent through lines 16 and 20 to reboiler 21 which is associated with column 22 wherein ethyl benzene is fractionally distilled overhead from a bottom styrene fraction. A third portion of the cooled reactor effluent comprising about 6% of the effluent passes through lines 16 and 23 to reboiler 24 which is used to provide distillation heat to distillation column 25. In distillation column 25, a benzene-tolene fraction is fractionally distilled overhead from a bottoms ethyl benzene-styrene containing fraction.

About 38% of the cooled effluent is not required to provide distillation heat to the said distillation columns 19, 22 and 25 and passes through lines 16 and 26 and is condensed in condenser 27 by indirect heat exchange with cooling water. At times of startup, shutdown or for control purposes some steam could be added together with the reactor effluent going to the reboiler-condensers.

The reboilers 18, 21 and 24 are reboiler condensers wherein by indirect heat exchange the reactor effluent from cooler 115 is further cooled and partially condensed and liquid from the base of the respective distillation column is heated and vaporized. In this way, the heat of condensation of the water vapor in the reactor effluent is economically employed to provide the necessary distillation heat for the separation of product styrene from other materials associated therewith. Care is taken to distribute sufficient amount of vapor to the distillation columns so as to prevent condensation of styrene.

The partially condensed reactor effluent is combined by means of lines 28, 29 and 30 with any effluent that bypasses the reboilers, passed through condenser 27, and sent by means of line 28 to separator 29. In the separator, the mixture is decanted and a lower aqueous layer is removed by means of line 30. Vent gas which is principally hydrogen produced during the course of dehydrogenation reaction together with small quantities of CO, $CO_2$ and methane is separated and removed through line 31. The organic phase which contains the product styrene is removed by line 32 and is passed by means not shown to the distillation column 25 wherein benzene and toluene are separated, then to column 22 wherein ethyl benzene is separated, and finally to column 19 wherein highly pure styrene is obtained as product overhead distillate.

The temperature and pressures employed in the distillation columns 25, 22 and 19 are such as are known in the art.

The crude styrene illustratively has a composition by weight of about 37% styrene, 61% ethyl benzene, 1% toluene, 0.7% benzene, and 0.3% tar. Inhibitor is added at appropriate locations in the distillation columns to prevent polymerization of the styrene, i.e., to the column reflux streams.

In column 25, at 157 mm. of mercury pressure, benzene and toluene in amount of about 2 parts distill overhead at a head temperature of about 57° C. The bottoms containing styrene, ethyl benzene, and tar at about 90° C. passes to column 22. Column 22 is operated at 35 mm. of mercury pressure and with a bottoms temperature of 90° C. Ethyl benzene in amount of about 61 parts is distilled overhead and can be recycled to the dehydrogenation reactor.

The bottoms comprising styrene and tar is passed to column 19 wherein by appropriate lowering of the operating pressure substantially pure styrene is distilled overhead in amount of about 37 parts and thus separated from the bottoms tar. A suitable operating pressure for this distillation column is 20 mm. of mercury pressure.

By the above described process, it is apparent that outstanding economies of operation are achieved.

It will be apparent to those skilled in the art that numerous departures can be made from the preferred embodiment of the invention as described above. Thus, desirably, the water vapor in the reactor effluent can be employed to provide distillation heat to less than all of the three columns formerly used for the purification of the product styrene. However, in its most desirable aspects, the invention is practiced whereby the water vapor provides distillation heat to all of the columns as above described. In some cases where the benzene and toluene mixture from this distillation are separated from each other, this heat source could also be used for this separation.

In view of the foregoing disclosures, variations and modifications thereof will be apparent to those skilled in the art, and it is intended to include within the invention all such variations and modifications except as do not come within the scope of the appended claims.

I claim:

1. In a process for the production of styrene by the dehydrogenation of ethyl benzene in the presence of steam wherein the reactor effluent contains steam and organic material including styrene, and wherein the styrene is separated from the reactor effluent by distillation, the improvement which comprises: indirectly contacting at least portion of the gaseous reactor effluent with a liquid stream from said distillation so as to condense the steam, but not a substantial amount of said organic material, in said reactor effluent, thereby providing distillation heat for said distillation.

2. In a process for the production of styrene by the dehydrogenation of ethylbenzene in the presence of steam wherein the gaseous reactor effluent contains steam and organic material including styrene, and wherein the styrene is separated from the reactor effluent by distillation, the improvement which comprises: indirectly contacting a water-containing portion of the gaseous reactor effluent with a cooler portion of said gaseous reactor effluent from which an aqueous phase has been separated, and condensing steam in the water-containing portion of the gaseous reactor effluent to provide distillation heat for said portion from which an aqueous phase has been separated, substantially none of the organic material in said water-containing portion being condensed with the steam.

3. A process according to claim 2 wherein the aqueous phase is separated by decanting.

4. A process according to claim 2 wherein an aqueous phase is separated from the water-containing portion of the gaseous reactor effluent after condensing steam in said effluent, and wherein said effluent from which said aqueous phase has been separated forms the portion for which distillation heat is provided by the water-containing portion of the gaseous reactor effluent.

References Cited by the Examiner
UNITED STATES PATENTS

| | | | |
|---|---|---|---|
| 2,413,674 | 12/1946 | Weir | 260—669 |
| 3,162,694 | 12/1964 | Beavon | 260—683.62 |

FOREIGN PATENTS 541,797  12/1941  Great Britain.

DELBERT E. GANTZ, *Primary Examiner.*

C. R. DAVIS, *Assistant Examiner.*